(12) United States Patent
Sakaguchi et al.

(10) Patent No.: US 7,730,933 B2
(45) Date of Patent: Jun. 8, 2010

(54) CERAMICS PARTICLE

(75) Inventors: Mikio Sakaguchi, Wakayama (JP); Masayuki Kato, Toyohashi (JP); Kazuo Oki, Wakayama (JP)

(73) Assignee: Kao Corporation, Tokyo (JP)

( * ) Notice: Subject to any disclaimer, the term of this patent is extended or adjusted under 35 U.S.C. 154(b) by 323 days.

(21) Appl. No.: 11/262,849

(22) Filed: Nov. 1, 2005

(65) Prior Publication Data

US 2006/0090876 A1    May 4, 2006

(30) Foreign Application Priority Data

Nov. 2, 2004   (JP) ............................. 2004-319659

(51) Int. Cl.
  B22C 1/00        (2006.01)
  B22C 9/02        (2006.01)
(52) U.S. Cl. .......................... 164/15; 164/529; 164/349
(58) Field of Classification Search ................. 164/529, 164/349, 15; 501/54, 55, 69, 72
  See application file for complete search history.

(56) References Cited

U.S. PATENT DOCUMENTS 4,923,520 A * 5/1990 Anzai et al. .................. 106/490

FOREIGN PATENT DOCUMENTS

| | | | |
|---|---|---|---|
| EP | 1422196 A1 | 5/2004 | |
| JP | 11-188454 | 7/1999 | |
| JP | 2001-71094 | * 3/2001 | |
| JP | 2001071094 | * 3/2001 | |
| JP | 2004-202577 | * 7/2004 | |
| JP | 2004-202577 A | * 7/2004 | |
| WO | WO-2004/052572 A1 | 6/2004 | |

OTHER PUBLICATIONS

Japanese Office Action issued in corresponding Japanese Patent Application No. 2005-314424 on Feb. 16, 2010.

* cited by examiner

*Primary Examiner*—Kevin P Kerns
(74) *Attorney, Agent, or Firm*—Birch, Stewart, Kolasch & Birch, LLP

(57) ABSTRACT

A ceramics particle produced by a flame fusion method, containing MgO and $SiO_2$ as main components, and having a $MgO/SiO_2$ weight ratio of from 1.0:1 to 1.45:1, and an average particle size of from 0.001 to 1.5 mm; a spherical molding sand containing MgO and $SiO_2$ as main components, and having a $MgO/SiO_2$ weight ratio of from 1.0:1 to 1.45:1, and an average particle size of from 0.001 to 1.5 mm, produced by a flame fusion method; a spherical molding sand, comprising MgO and $SiO_2$ as main components, and having a $MgO/SiO_2$ weight ratio of from 1.0:1 to 1.45:1, an average particle size of from 0.001 to 1.5 mm, and a spherical degree of 0.95 or more; a process for producing the above spherical molding sand; a casting mold containing the spherical molding sand as defined above; and a casting produced by casting with the mold as defined above.

30 Claims, 2 Drawing Sheets 0.2mm 0.2mm

CERAMICS PARTICLE

FIELD OF THE INVENTION

The present invention relates to a ceramics particle, and more specifically to a ceramics particle used as a spherical molding sand which can be used for a mold for casting cast steels, cast iron, aluminum, copper and alloys thereof, a process for producing the same, a casting mold, and a casting.

BACKGROUND OF THE INVENTION

As a technique of improving spherical degree and lowering in water absorption of a molding sand, thereby improving its fluidity and filling ability during the production of a casting mold, JP2004-202577 A discloses a spherical molding sand produced by a flame fusion method, wherein the spherical molding sand contains $Al_2O_3$ and $SiO_2$ as main components.

SUMMARY OF THE INVENTION

The present invention relates to:

[1] a ceramics particle produced by a flame fusion method, wherein the ceramics particle contains MgO and $SiO_2$ as main components, and has a MgO/$SiO_2$ weight ratio of from 0.1 to 10 and an average particle size of from 0.001 to 1.5 mm;

[2] a spherical molding sand produced by a flame fusion method, wherein the spherical molding sand contains MgO and $SiO_2$ as main components, and has a MgO/$SiO_2$ weight ratio of from 0.1 to 10, and an average particle size of from 0.001 to 1.5 mm;

[3] the spherical molding sand according to the above [2], wherein the spherical molding sand has an average particle size of from 0.05 to 1.5 mm;

[4] a spherical molding sand, wherein the spherical molding sand contains MgO and $SiO_2$ as main components, and has a MgO/$SiO_2$ weight ratio of from 0.1 to 10, an average particle size of from 0.001 to 1.5 mm, and a spherical degree of 0.95 or more;

[5] the spherical molding sand according to the above [4], wherein the spherical molding sand has an average particle size of from 0.05 to 1.5 mm;

[6] the spherical molding sand according to the above [2], wherein the spherical molding sand has a water absorption of 1.5% by weight or less;

[7] the spherical molding sand according to the above [3], wherein the spherical molding sand has a water absorption of 1.5% by weight or less;

[8] the spherical molding sand according to the above [4], wherein the spherical molding sand has a water absorption of 1.5% by weight or less;

[9] the spherical molding sand according to the above [5], wherein the spherical molding sand has a water absorption of 1.5% by weight or less;

[10] a method of using a particle produced by a flame fusion method, wherein the particle contains MgO and $SiO_2$ as main components, and has a MgO/$SiO_2$ weight ratio of from 0.1 to 10, and an average particle size of from 0.001 to 1.5 mm as a spherical molding sand;

[11] the method according to the above [10], wherein the particle has an average particle size of from 0.05 to 1.5 mm;

[12] a method of using a particle containing MgO and $SiO_2$ as main components, and having a MgO/$SiO_2$ weight ratio of from 0.1 to 10, an average particle size of from 0.001 to 1.5 mm, and a spherical degree of 0.95 or more as a spherical molding sand;

[13] the method according to the above [12], wherein the particle has an average particle size of from 0.05 to 1.5 mm;

[14] a process for producing a spherical molding sand, wherein the spherical molding sand contains MgO and $SiO_2$ as main components, and having a MgO/$SiO_2$ weight ratio of from 0.1 to 10, and an average particle size of from 0.001 to 1.5 mm, including the step of fusing in flame, powder particles containing MgO and $SiO_2$ as main components, and having a MgO/$SiO_2$ weight ratio of from 0.1 to 10, and an average particle size of from 0.001 to 2 mm, to form spherical particles;

[15] the process according to the above [14], wherein the powder particles have an average particle size of from 0.05 to 2 mm, to give a spherical molding sand having an average particle size of from 0.05 to 1.5 mm;

[16] a process for producing a spherical molding sand, wherein the spherical molding sand contains MgO and $SiO_2$ as main components, and has a MgO/$SiO_2$ weight ratio of from 0.1 to 10, an average particle size of from 0.001 to 1.5 mm, and a spherical degree of 0.95 or more, including the step of fusing in flame, powder particles containing MgO and $SiO_2$ as main components, and having a MgO/$SiO_2$ weight ratio of from 0.1 to 10, and an average particle size of from 0.001 to 2 mm, to form spherical particles;

[17] the process according to the above [16], wherein the powder particles have an average particle size of from 0.05 to 2 mm, to give a spherical molding sand having an average particle size of from 0.05 to 1.5 mm;

[18] a casting mold containing a spherical molding sand produced by a flame fusion method, wherein the spherical molding sand contains MgO and $SiO_2$ as main components, and having a MgO/$SiO_2$ weight ratio of from 0.1 to 10, and an average particle size of from 0.001 to 1.5 mm;

[19] the casting mold according to the above [18], wherein the spherical molding sand has an average particle size of from 0.05 to 1.5 mm;

[20] a casting mold containing a spherical molding sand, wherein the spherical molding sand contains MgO and $SiO_2$ as main components, and has a MgO/$SiO_2$ weight ratio of from 0.1 to 10, an average particle size of from 0.001 to 1.5 mm, and a spherical degree of 0.95 or more;

[21] the casting mold according to the above [20], wherein the spherical molding sand has an average particle size of from 0.05 to 1.5 mm;

[22] a casting produced by casting with a casting mold containing a spherical molding sand produced by a flame fusion method, wherein the spherical molding sand contains MgO and $SiO_2$ as main components, and has a MgO/$SiO_2$ weight ratio of from 0.1 to 10, and an average particle size of from 0.001 to 1.5 mm;

[23] the casting according to the above [22], wherein the spherical molding sand has an average particle size of from 0.05 to 1.5 mm;

[24] a casting produced by casting with a casting mold containing a spherical molding sand, wherein the spherical molding sand contains MgO and $SiO_2$ as main components, and has a MgO/$SiO_2$ weight ratio of from 0.1 to 10, an average particle size of from 0.001 to 1.5 mm, and a spherical degree of 0.95 or more; and

[25] the casting according to the above [24], wherein the spherical molding sand has an average particle size of from 0.05 to 1.5 mm.

DETAILED DESCRIPTION OF THE INVENTION

Figure 1:
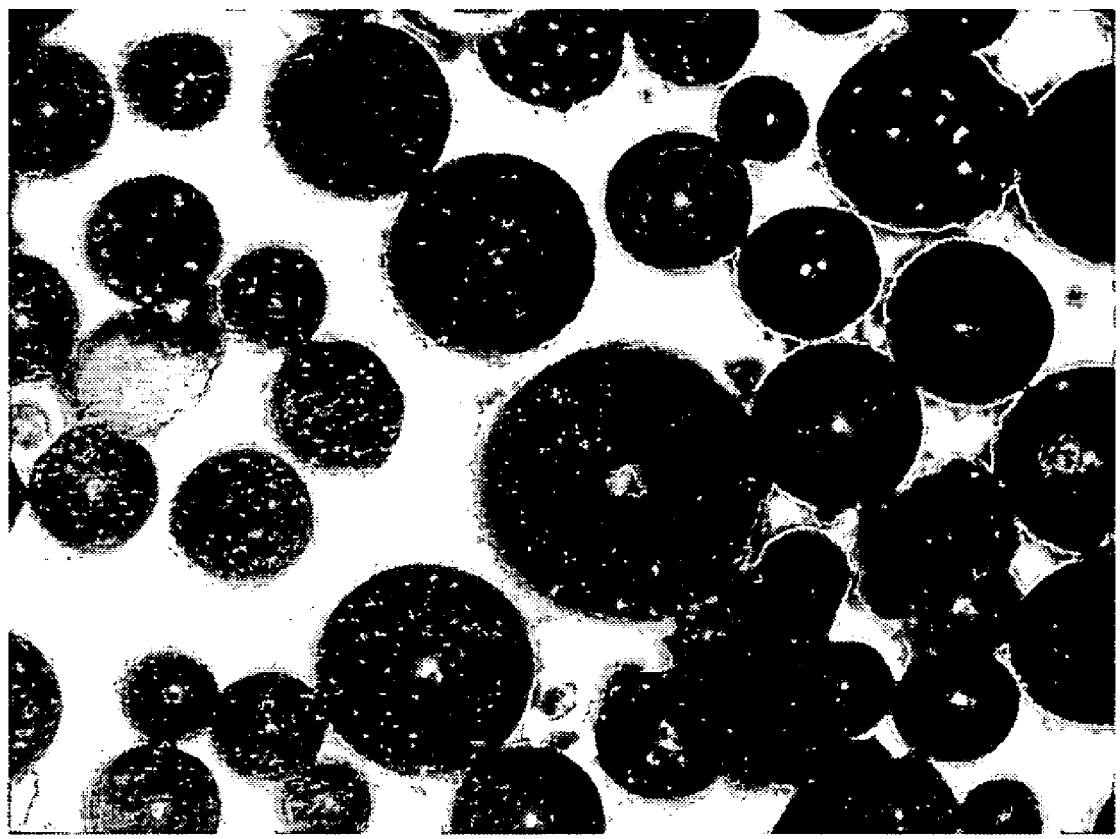
FIG. 1 is a photograph of the molding sand obtained in Example 1, taken by the reflecting microscope (magnification: 100)

The present invention relates to a ceramics particle, and more specifically to a ceramics particle which is used for a spherical molding sand that is capable of producing a casting mold which is excellent in not only corrosion resistance and seizure resistance, but also strength and surface smoothness, and a process for producing the molding sand, and a casting mold made therefrom.

The ceramics particle of the present invention is excellent in not only corrosion resistance and seizure resistance but also strength and surface smoothness; therefore, when the ceramics particle is used, for example, for a spherical molding sand, a casting mold having these excellent properties can be obtained.

These and other advantages of the present invention will be apparent from the following description.

The ceramics particle of the present invention which contains MgO and $SiO_2$ as main components, and has a $MgO/SiO_2$ weight ratio of from 0.1 to 10 and an average particle size of from 0.001 mm to 1.5 mm, preferably from 0.05 mm to 1.5 mm, is produced by a method such as a flame fusion method, and is used as a spherical molding sand, a filler, a pigment, or the like. The use of the ceramics particle is not particularly limited, and a case where the ceramics particle is used as a spherical molding sand will be described hereinbelow as a preferred embodiment.

An improvement in corrosion resistance and seizure resistance of the casting mold is one of important matters for improvements in the quality of and productivity for castings. However, such a matter has not been substantially studied from the viewpoint of the improvement in corrosion resistance and seizure resistance of a molding sand, which is a material for the casting mold.

The present inventors have proposed a spherical molding sand produced by a flame fusion method, wherein the spherical molding sand has a high spherical degree and a low water absorption, and is excellent in fluidity during the production of a mold. Furthermore, the present inventors have remarked on the relationship between the composition of the molding sand and the flame fusion method, and found that corrosion resistance and seizure resistance of the molding sand are remarkably improved in a specified composition. The present invention has been accomplished thereby.

One of the significant features of the spherical molding sand of the present invention resides in that the spherical molding sand has a specified composition of components and a specified average particle size, and a high spherical degree. There are roughly two embodiments for the spherical molding sand of the present invention as compared to conventional molding sands: In the first embodiment, the spherical molding sand is produced by a flame fusion method, wherein the spherical molding sand contains MgO and $SiO_2$ as main components, and has a $MgO/SiO_2$ weight ratio of from 1.0 to 10 and an average particle size of from 0.001 to 1.5 mm, and preferably from 0.05 to 1.5 mm. In the second embodiment, the spherical molding sand contains MgO and $SiO_2$ as main components and, has a $MgO/SiO_2$ weight ratio of from 0.1 to 10, an average particle size of from 0.001 to 1.5 mm, and preferably from 0.05 to 1.5 mm, and a spherical degree of 0.95 or more. The process for producing the spherical molding sand of the second embodiment is not limited to the flame fusion method. According to these embodiments, the spherical molding sand of the present invention has excellent corrosion resistance and seizure resistance. In other words, corrosion resistance and seizure resistance exhibited by the $MgO/SiO_2$-based molding sand of the present invention is remarkable beyond expectation as compared to the corrosion resistance and seizure resistance exhibited by $MgO/SiO_2$-based molding sand produced by a conventional method. Also, the spherical molding sand enables to produce a casting mold having a high strength and a smooth surface. Furthermore, the spherical molding sand of the present invention has excellent fluidity, enables to produce a casting mold with a binder in an amount smaller than those of binders contained in a conventional casting mold, and is regenerated easily. Although not wanting to be limited by theory, the reason why such advantages can be accomplished is due to a relatively low water absorption of the spherical molding sand of the present invention.

The corrosion resistance and the seizure resistance of the spherical molding sand of the present invention refer to resistance to erosion caused by molten iron, steel, aluminum, copper, and various alloys and slag. Although not wanting to be limited by theory, it is thought that its chemical composition, compactness, i.e., low water absorption, surface smoothness, filling ability of the molding sand, and the like contribute to the exhibition of the corrosion resistance and the seizure resistance. It is thought that a given average particle size and a high spherical degree of the molding sand of the present invention mainly contribute to the exhibition of the fluidity of the spherical molding sand of the present invention. Also, it is thought that the average particle size and the spherical degree contribute to the exhibition of excellent filling ability, and the spherical molding sand of the present invention generally has excellent filling ability. The corrosion resistance, the seizure resistance and the fluidity of the spherical molding sand of the present invention can be evaluated according to the method described in Examples set forth below. On the other hand, it is thought that the excellent filling ability contributes to an improvement in the strength of the casting mold, so that the filling ability can be evaluated indirectly according to the degree of the strength of the casting mold in Test Example 1 described later.

The term "spherical shape," which is the shape of the spherical molding sand of the present invention, refers to a shape having a spherical degree of 0.88 or more, and preferably 0.90 or more. Whether or not the molding sand of the present invention has a spherical shape can be evaluated by observing the molding sand with, for example, an optical microscope, a digital scope (for example, commercially available from KEYENCE, Model VH-8000) or the like as described later.

The spherical molding sand of the present invention contains MgO and $SiO_2$ as the main components, and the term "main components" as used herein refers to MgO and $SiO_2$ which are contained in a total amount of 60% by weight or more of all the components of the entire molding sand.

MgO and $SiO_2$, which are the main components of the spherical molding sand of the present invention, are contained in a total amount of preferably from 65 to 100% by weight, and more preferably from 80 to 100% by weight of all the components of the spherical molding sand, from the viewpoint of an improvement in fire-resistant property. The contents of MgO and $SiO_2$ can be determined by a known analytical method, for example, a wet gravimetric method or an X-ray fluorescence method.

In addition, the $MgO/SiO_2$ weight ratio is from 0.1 to 10. The $MgO/SiO_2$ weight ratio is preferably from 0.2 to 9, and more preferably from 0.3 to 5, from the viewpoint of improvements in the ease of formation of spherical particles, corrosion resistance, seizure resistance, fire-resistant property, and regeneration efficiency of the molding sand.

Substances which can be contained in the spherical molding sand of the present invention as components other than the main components include metallic oxides such as $Al_2O_3$, $Fe_2O_3$, $TiO_2$, $K_2O$, and $Na_2O$. These oxides are derived from a raw material for the molding sand. When $Al_2O_3$ is contained in the molding sand, $Al_2O_3$ is contained in an amount of preferably 10% by weight or less from the viewpoint of the improvement in corrosion resistance and seizure resistance of the spherical molding sand. When $Fe_2O_3$ and $TiO_2$ are contained in the molding sand, each is contained in an amount of preferably 10% by weight or less. Also, $Fe_2O_3$ is contained in an amount of preferably 10% by weight or less. When $K_2O$ and $Na_2O$ are contained in the molding sand, these compounds are contained in a total amount of preferably 3% by weight or less, and more preferably 2% by weight or less.

The spherical molding sand of the present invention has an average particle size (mm) within a range of from 0.001 to 1.5 mm, and preferably from 0.05 to 1.5 mm. When the average particle size is less than 0.001 mm, it is not preferable because a large amount of binder is necessary for producing a mold and it is difficult to regenerate as molding sand. On the other hand, when the average particle size is more than 1.5 mm, it is unfavorable because a void ratio of a mold becomes large, leading to decrease in mold strength. The average particle size is even more preferably from 0.075 to 1.5 mm from the viewpoint of increase in regeneration efficiency of the spherical molding sand. On the other hand, the average particle size is preferably from 0.05 to 1 mm from the viewpoint of improvement in mold strength. The average particle size is more preferably 0.05 to 0.5 mm, and even more preferably 0.05 to 0.35 mm, from the viewpoint of improvement in both of regeneration efficiency and mold strength.

The above average particle size can be obtained as follows: Specifically, when the spherical degree is 1 according to a particle projected section of a spherical molding sand particle, its diameter (mm) is measured; when the spherical degree is less than 1, the major axis diameter (mm) and minor axis diameter (mm) of a randomly aligned spherical molding sand particle are measured to obtain the value of (major axis diameter+minor axis diameter)/2; and then the respectively obtained values arbitrarily selected from 100 numbers of the spherical molding sand particles, are averaged to obtain an average diameter (mm). The major axis diameter and the minor axis diameter are defined as follows: When a particle is stably placed on a plane and then a projection image thereof on the plane is edged with two parallel lines, the width of the particle which makes distance between the parallel two lines minimum is defined as the minor axis diameter; on the other hand, the distance between another parallel two lines which edges the particle in the direction orthogonally crossing the former parallel two lines is defined as the major axis diameter.

The major axis diameter and the minor axis diameter can be obtained by image analysis on an image (photograph) of the particle taken by an optical microscope or a digital scope (for example, commercially available from KEYENCE, Model VH-8000). The spherical degree is obtained by the following method: The image taken is subjected to image analysis to obtain an area of particle projected section of the particle and a peripheral length thereof, followed by calculation of [peripheral length (mm) of complete round having the same area as the area ($mm^2$) of particle projected section]/[peripheral length (mm) of particle projected section], and then by averaging respectively obtained values selected from arbitrary 50 spherical molding sand particles.

The spherical molding sand of the first embodiment of the present invention is produced by a flame fusion method. Therefore, the spherical molding sand has structural features of having a high spherical degree and being compact. The structural features greatly contribute to improvements in fluidity, strength of the casting mold, and surface smoothness of a molded casting.

The spherical molding sand of the first embodiment of the present invention has a spherical degree of preferably 0.95 or more, more preferably 0.98 or more, and even more preferably 0.99 or more, from the viewpoint of the improvement in the fluidity. Therefore, as the spherical molding sand of the first embodiment of the present invention, a spherical molding sand produced by a flame fusion method, wherein the spherical molding sand, for example, contains MgO and $SiO_2$ as main components, and has a $MgO/SiO_2$ weight ratio of from 0.1 to 10, an average particle size of from 0.05 to 0.5 mm, and a spherical degree of 0.95 or more is preferable.

On the other hand, the spherical molding sand of the second embodiment of the present invention has a spherical degree of 0.95 or more. The spherical degree is preferably 0.98 or more, and more preferably 0.99 or more, from the viewpoint of improvement in the fluidity.

In addition, the spherical molding sand of the present invention has a water absorption (% by weight) of preferably 1.5% by weight or less, and more preferably 0.9% by weight or less, from the viewpoint of suppression of an increase in the amount of the binder used during the production of the casting mold caused by the absorption of the binder into the internal of the molding sand, the improvement in the strength of the mold, and the like. The water absorption can be determined according to a method for determining the water absorption of fine aggregate as prescribed in JIS A1109.

The water absorption of the spherical molding sand produced by a flame fusion method is usually lower than that of sands produced by a baking method, which is a method other than the flame fusion method if the spherical degree is the same.

In addition, although not wanting to be limited by theory, the low water absorption of the spherical molding sand generally means that the particle has a structure so that the number of open pores of the particle is small, and the spherical molding sand as described above has high strength and excellent pulverizability resistance. Pulverizability resistance is one of indices showing the regeneration efficiency of the molding sand. In addition, the spherical molding sand is also excellent in corrosion resistance and seizure resistance because a molten metal or slag is less likely to be penetrated. The spherical molding sand of the present invention is excellent in water absorption, pulverizability resistance, corrosion resistance, and seizure resistance, and these properties contribute to the exhibition of the excellent regeneration efficiency of the molding sand. The term "regeneration efficiency" refers to a ratio of a molding sand that can be regenerated and reused, which has been used for the production of a casting mold.

On the other hand, when the spherical molding sand of the present invention is contained in a mixture of the spherical molding sand and a known molding sand having low fluidity, such as silica sand, in an amount of preferably 50% by volume or more, the molding sand containing the mixture can satisfactorily exhibit the desired effects of the present invention. In other words, when the spherical molding sand of the present invention is gradually added to the known molding sand as mentioned above, the desired effects of the present invention are exhibited according to the amount, and the effects become remarkable when the spherical molding sand of the present invention having a given spherical degree is contained in the mixture containing the molding sand in an amount of 50% by volume or more. Here, the spherical molding sand of the present invention is contained in the mixture containing the molding sand in an amount of more preferably 60% by volume or more, and even more preferably 80% by volume or more. Since the spherical molding sand of the present invention is excellent utility, the molding sand having a spherical degree of 0.98 or more is even more preferable. In addition, since the molding sand containing the spherical molding sand in an amount of 50% by volume or more can exhibit the effects equivalent to those of the spherical molding sand of the present invention, the molding sand is also encompassed in the present invention.

The process for producing a ceramics particle of the present invention includes a process including the step of fusing in flame, powder particles containing MgO and $SiO_2$ as main components and having a $MgO/SiO_2$ weight ratio of from 0.1 to 10 and an average particle size of from 0.001 to 2 mm, preferably from 0.05 to 2 mm, to form spherical particles (flame fusion method). Here, the spherical molding sand of the first embodiment of the present invention is produced by the flame fusion method as mentioned above. On the other hand, the spherical molding sand of the second embodiment of the present invention can be produced by a known process such as a granulation-sintering method, an electromelted atomizing method, and the like. Even more, it is preferable that the spherical molding sand of the second embodiment is produced by a flame fusion method in the same manner as in the spherical molding sand of the first embodiment of the present invention. Therefore, an example of the process for producing a spherical molding sand of the present invention according to a flame fusion method will be described hereinbelow. Also, such a production method is encompassed in the present invention.

The process for producing a spherical molding sand of the present invention includes the step of fusing in flame, powder particles containing MgO and $SiO_2$ as main components and having a $MgO/SiO_2$ weight ratio of from 0.1 to 10 and an average particle size of from 0.001 to 2 mm, and preferably from 0.05 to 2 mm as a raw material, to form spherical particles. The average particle size of the raw material powder particles can be also determined in the same manner as the average particle size of the particles of the spherical molding sand of the present invention.

The phrase "containing MgO and $SiO_2$ as main components" in the process for producing a spherical molding sand of the present invention refers to a case where the composition of the components of the starting raw materials is adjusted so that MgO and $SiO_2$ are contained in the spherical molding sand of the present invention in a total amount of 60% by weight or more, preferably from 65 to 100% by weight, and more preferably from 80 to 100% by weight of the entire. Therefore, as long as the spherical molding sand "contains MgO and $SiO_2$ as main components," the powder particles may be made of a mixture of a raw material for a source of MgO and a raw material for a source of $SiO_2$, a single raw material for a source of (MgO+$SiO_2$), or a mixture of the raw material for the source of MgO and/or the raw material for the source of $SiO_2$, and the raw material for the source of (MgO+$SiO_2$), each source of which is described later.

The powder particles as the starting raw material contain MgO and $SiO_2$ as main components in a total amount of preferably 75% by weight or more, more preferably 80% by weight or more, even more preferably from 85 to 100% by weight, and even more preferably from 90 to 100% by weight, from the viewpoint of adjusting a total amount of MgO and $SiO_2$ in the spherical molding sand obtained to 80% by weight or more of all the components. The powder particles have a $MgO/SiO_2$ weight ratio of from 0.1 to 10, preferably from 0.2 to 9, and more preferably from 0.3 to 6, from the viewpoint of adjusting a $MgO/SiO_2$ weight ratio of the spherical molding sand obtained to a range from 0.1 to 10. The powder particles have an average particle size of 0.001 mm or more, and preferably 0.05 mm or more, from the viewpoint of obtaining the monodispersed spherical molding sand, and an average particle size of 2 mm or less, from the viewpoint of obtaining a spherical molding sand having a desired spherical degree. The powder particles have an average particle size of from 0.001 to 2 mm and preferably from 0.05 to 2 mm for the purpose of satisfying both the viewpoints. The powder particles have an average particle size of more preferably from 0.05 to 1.5 mm, from the viewpoint of improvement in the spherical degree of the spherical molding sand obtained.

In order to obtain the spherical molding sand of the present invention, the powder particles are used as starting raw materials so that the powder particles are adjusted to have a $MgO/SiO_2$ weight ratio and an average particle size within the above range in consideration of the components evaporated during the fusion.

When the starting raw material powder particles contain water during the fusion of the particles, many open pores are formed in the molding sand obtained due to evaporation of water. The formation of the open pores leads to an increase in the water absorption of the molding sand and a decrease in the spherical degree of the molding sand. Therefore, the water content (% by weight) of the starting raw material is preferably 10% by weight or less, more preferably 3% by weight or less, and even more preferably 1% by weight or less from the viewpoint of adjusting the water absorption and the spherical degree of the spherical molding sand obtained within suitable ranges. The water content is determined from the amount of water loss when 10 g of powdery particles are heated at 800° C. for 1 hour.

The starting raw material can be selected from, for example, fire-resistant ore materials and synthetic materials. The raw material for the source of MgO includes magnesium carbonate, magnesium hydroxide, olivine, pyroxene, dunite, serpentine, olivine-based minerals and the like. The raw material for the source of $SiO_2$ includes silica rock, silica sand, quartz, cristobalite, amorphous silica, feldspar, pyrophyllite and the like. The raw material for the source of (MgO+$SiO_2$) include forsterite, enstatite, olivine, pyroxene, dunite, serpentine, basalt, olivine-based minerals and the like. These raw materials can be used alone or in an admixture containing two or more kinds. The selected starting raw material is preferably calcined and used in order to reduce its water content or to facilitate its fusing. The calcined raw material powder particles are exemplified by calcined serpentine, calcined olivine, calcined pyroxene, calcined dunite forsterite, calcined enstatite and the like.

In the step of fusing the starting raw material powder particles in flame to form spherical particles, the starting raw materials as mentioned above are fused by dispersing the starting raw materials in a carrier gas such as oxygen, and introducing into a flame, to form spherical particles (which is referred to as flame fusion method). In a preferred embodiment of the present invention, the starting raw material is introduced into the following flame.

The flame used is generated by burning a fuel, such as propane, butane, methane, a natural liquefied gas, LPG, heavy oil, kerosene, gas oil, or powdered charcoal, with oxygen. The volume ratio of the fuel to oxygen is preferably from 1.01 to 1.03, from the viewpoint of complete combustion. An oxygenation air burner or an oxygen gas burner is suitable for generating a hot flame. Among them, the oxygen gas burner is even more preferable. The structure of the burner is not particularly limited, and the burner can be exemplified by ones disclosed in JP-A-Hei-7-48118, JP-A-Hei-11-132421, JP2000-205523 A and JP2000-346318 A.

In order to form spherical particles from the raw material fire-resistant powder particles used in the process of the present invention, which have a large average particle size falling within the range of from 0.001 to 2 mm, and preferably from 0.05 to 2 mm, the following technique is suitable.

The powder particles are introduced into the flame after the dispersion of the powder particles into a carrier gas. As the carrier gas, oxygen is preferably used. In this case, oxygen for the carrier gas offers an advantage that the oxygen can be consumed for fuel combustion. The powder concentration in the gas is preferably from 0.1 to 20 $kg/Nm^3$, and more preferably from 0.2 to 10 $kg/Nm^3$, from the viewpoint of ensuring satisfactory dispersibility of the powder particles.

The shape and the composition of the raw material powder particles are preferably selected from the viewpoint of rapidly forming spherical particles in the flame and at the same time obtaining the monodispersed spherical molding sand. As the shape, the raw material powder particles have a major axis diameter/minor axis diameter ratio of preferably 9 or less, more preferably 4 or less, and even more preferably 2 or less, from the viewpoint of ensuring the residence time in the flame and fusing to rapidly form spherical particles.

In addition, the powder particles can be preferably fused to form spherical particles even in plasma jet flame generated by the ionization of a gas or the like.

Here, the temperature of the flame is appropriately from about 1800° to about 3000° C.

According to the above process, the desired spherical molding sand of the present invention can be obtained. The molding sand is highly excellent in fluidity. In addition, as described above, a molding sand capable of exhibiting the effects equivalent to that of the spherical molding sand of the present invention can be obtained by properly mixing the spherical molding sand and a known molding sand so that the spherical molding sand of the present invention is contained in a given proportion. When these molding sands are used in the production of a casting mold, the molding sands can be regenerated efficiently as a molding sand because the amount of a binder used can be lowered.

The spherical molding sand of the present invention and a molding sand containing a mixture of the spherical molding sand and a known molding sand (these molding sands are hereinafter simply referred to as the molding sand of the present invention) can be used suitably for applications in a mold for cast steel, cast iron, aluminum, copper, alloys thereof, and the like. Also, the molding sand of the present invention can be used as a filler for a metal, a plastic, or the like.

The molding sand of the present invention, alone or in combination with any other known molding sand, such as silica sand, can be mixed in combination with an inorganic filler, such as clay, water glass, or silica sol, or an organic filler, such as furan resin, phenol resin, or furan-phenol resin, and a fire-resistant aggregate, and cast according to a known casting method with a desired casting mold. As the amount of the binder used, it is preferable that the binder is used in an amount of from 0.05 to 5 parts by weight based on 100 parts by weight of the molding sand, from the viewpoint of obtaining a casting mold having a high strength. The mold thus obtained has a high strength and a smooth surface. Therefore, when cast with this casting mold, a casting having small surface roughness, thereby producing smaller loads on a subsequent polishing step can be obtained.

It is preferable that the molding sand of the present invention has a particle density ($g/cm^3$) within the range of from 2.5 to 3.5 $g/cm^3$, from the viewpoint of its use for the production of the casting mold. Since the molding sand of which particle density falls within the above range is solid and compact, a casting mold having a high strength can be obtained. The particle density can be determined according to the method for determining a particle density as prescribed in JIS R1620.

In addition, a construct having fewer surface and inner surface defects can be obtained by further properly working the above casting. The construct includes dies, engine parts, machinery parts, and building construction parts.

The casting mold, the casting, and the construct each of which has excellent properties are encompassed in the present invention.

EXAMPLES

The following examples further describe and demonstrate embodiments of the present invention. The examples are given solely for the purposes of illustration and are not to be construed as limitations of the present invention.

Example 1

Commercially available forsterite powder, containing MgO and $SiO_2$ in a total amount of 97% by weight and having a $MgO/SiO_2$ weight ratio of 1.4, a water content of 0% by weight, an average particle size of 0.29 mm, and a major axis diameter/minor axis diameter ratio of 1.5, was used as a starting raw material. Using oxygen as a carrier gas, the powder was introduced into a flame (approximately 2000° C.) generated by burning LPG (liquefied petroleum gas) and oxygen in a volume ratio of LPG to oxygen of 1.1, to give a monodispersed spherical molding sand. The molding sand obtained contained MgO and $SiO_2$ in a total amount of 97% by weight and had a $MgO/SiO_2$ weight ratio of 1.4, an average particle size of 0.26 mm, a spherical degree of 0.99, and a water absorption of 0.3% by weight. A photograph of the molding sand (magnification: 100) taken by a reflecting microscope (manufactured by Nikon Corporation) is shown in FIG. 1. It can be seen from FIG. 1 that each of the molding sand particles is spherical.

Example 2

The same procedures as in Example 1 were carried out except that the starting raw material had an average particle size of 0.5 mm and a major axis diameter/minor axis diameter ratio of 1.3, to give a monodispersed spherical molding sand. The molding sand obtained contained MgO and $SiO_2$ in a total amount of 97% by weight and had a $MgO/SiO_2$ weight ratio of 1.4, an average particle size of 0.48 mm, a spherical degree of 0.98, and a water absorption of 0.9% by weight.

Example 3

The same procedures as in Example 1 were carried out except that a commercial forsterite powder containing MgO and $SiO_2$ in a total amount of 97% by weight and having a $MgO/SiO_2$ weight ratio$_2$ of 1.08, an average particle size of 0.22 mm, a water content of 0.1% by weight, and a major axis diameter/minor axis diameter ratio of 1.3, was used as a starting raw material, to give a monodispersed spherical molding sand. The molding sand obtained contained MgO and $SiO_2$ in a total amount of 98% by weight and had a $MgO/SiO_2$ weight ratio of 1.08, an average particle size of 0.21 mm, a spherical degree of 0.99, and a water absorption of 0% by weight.

Example 4

The same procedures as in Example 1 were carried out except that olivine containing MgO and $SiO_2$ in a total amount of 95% by weight and having a $MgO/SiO_2$ weight ratio of 1.0, an average particle size of 0.45 mm, a water content of 0.2% by weight, and a major axis diameter/minor axis diameter ratio of 1.6, was used as a starting raw material, to give a monodispersed spherical molding sand. The molding sand obtained contained MgO and $SiO_2$ in a total amount of 95% by weight and had a $MgO/SiO_2$ weight ratio of 1.0, an average particle size of 0.35 mm, a spherical degree of 0.98, and a water absorption of 0% by weight.

Example 5

The same procedures as in Example 1 were carried out except that powder particles prepared by calcining a mixture of magnesium hydroxide and silica in a $MgO/SiO_2$ weight ratio of 1.45 in an electric furnace at a temperature of 900° C. for 1 hour, the powder particles containing MgO and $SiO_2$ in a total amount of 96% by weight and having an average particle size of 0.2 mm, a water content of 1.9% by weight, and a major axis diameter/minor axis diameter ratio of 1.8, were used as a starting raw material, to give a monodispersed spherical molding sand. The obtained molding sand contained MgO and $SiO_2$ in a total amount of 95% by weight and had a $MgO/SiO_2$ weight ratio of 1.45, an average particle size of 0.19 mm, a spherical degree of 0.99, and a water absorption of 0.2% by weight.

Comparative Example 1

Figure 2:
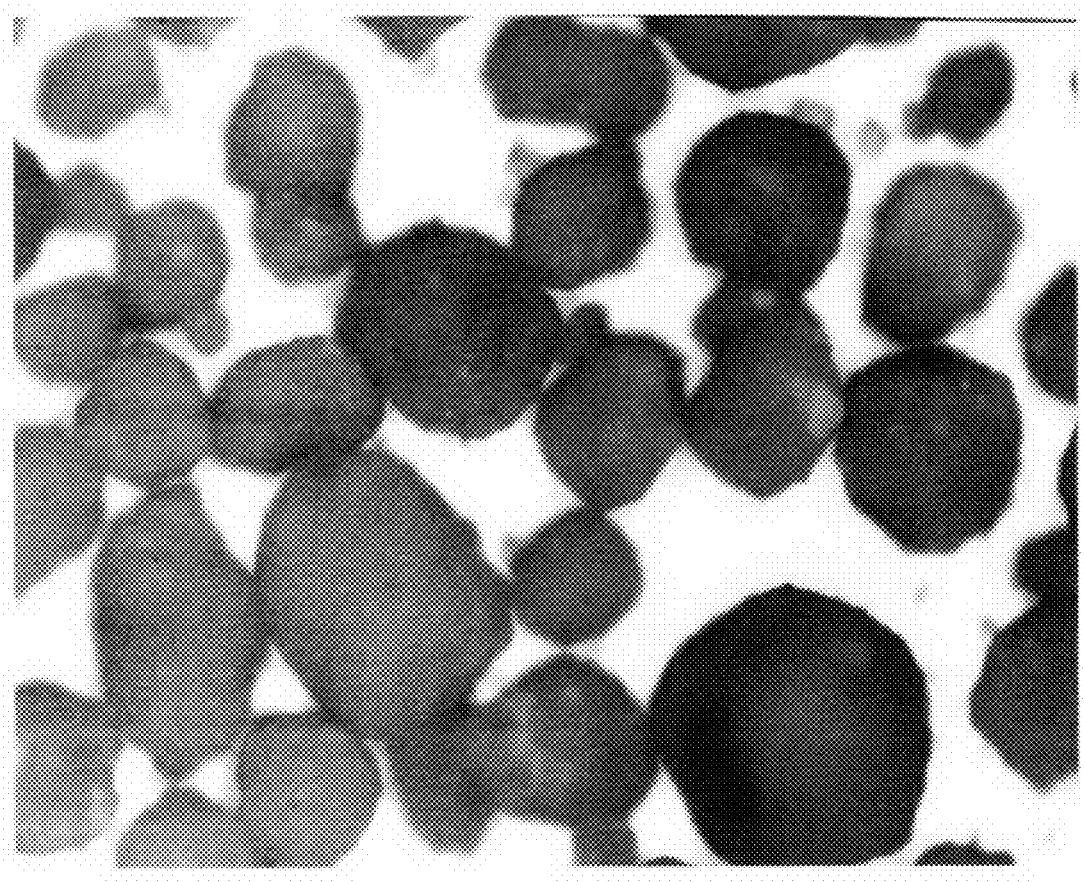
FIG. 2 is a photograph of the molding sand obtained in Comparative Example 1, taken by the reflecting microscope (magnification: 100).

Aluminum hydroxide and silica were mixed in an $Al_2O_3/SiO_2$ weight ratio of 3.0, and the mixture was formed into spherical particles with a spray-dryer to give powder particles containing $Al_2O_3$ and $SiO_2$ in a total amount of 96% by weight, the powder particles having an average particle size of 0.3 mm. The powder particles were baked in an electric furnace at a temperature of 1500° C. for 1 hour to give a molding sand. The obtained molding sand contained $Al_2O_3$ and $SiO_2$ in a total amount of 97% by weight and had an $Al_2O_3$ to $SiO_2$ weight ratio of 3.0, an average particle size of 0.26 mm, a spherical degree of 0.83, and a water absorption of 3.5% by weight. A photograph of the molding sand (magnification: 100) taken by a reflecting microscope (manufactured by Nikon Corporation) is shown in FIG. 2. It can be seen from FIG. 2 that the particles of this molding sand are low in the extent of formation of spherical particles, and has a low spherical degree.

Comparative Example 2

The same procedures as in Comparative Example 1 were carried out except that powder particles prepared by mixing magnesium hydroxide and silica in $MgO/SiO_2$ weight ratio of 1.59, the powder particles containing MgO and $SiO_2$ in a total amount of 97% by weight and having an average particle size of 0.2 mm and a water content of 2.9% by weight, were used as a starting raw material, to give a spherical molding sand. The obtained molding sand contained MgO and $SiO_2$ in a total amount of 97% by weight and had a $MgO/SiO_2$ weight ratio of 1.59, an average particle size of 0.19 mm, a spherical degree of 0.79, and a water absorption of 2.2% by weight.

Comparative Example 3

The same procedures as in Example 1 were carried out except that irregular shaped silica sand containing 99% by weight of $SiO_2$ and having an average particle size of 0.13 mm, as a starting raw material. The obtained molding sand contained $SiO_2$ in a total amount of 99% by weight and had an average particle size of 0.28 mm, a spherical degree of 0.92, and a water absorption of 0.6% by weight.

Comparative Example 4

The same procedures as in Example 1 were carried out except that powder particles prepared by mixing aluminum hydroxide and silica in an $Al_2O_3/SiO_2$ weight ratio of 2.5, calcining the mixture at 1100° C., and forming the calcined mixture into spherical powder particles (containing $Al_2O_3$ and $SiO_2$ in a total amount of 96% by weight) having an average particle size of 0.28 mm were used as a starting raw material, to give a molding sand. The obtained molding sand contained $Al_2O_3$ and $SiO_2$ in a total amount of 97% by weight and had an $Al_2O_3/SiO_2$ weight ratio of 2.5, an average particle size of 0.26 mm, a spherical degree of 0.83, and a water absorption of 3.5% by weight.

Test Example 1

The fluidity of the molding sands obtained in Examples 1 to 5 and Comparative Examples 1 to 4 was examined. Also, strength and the state of surface texture of the molds obtained from the molding sands were examined.

(1) Fluidity of Molding Sand

The flow time (seconds) was obtained by using a funnel according to JIS K 6721. The shorter the flow time, the more excellent the fluidity.

(2) Strength of Mold

Molding sand was classified into particles having a size of 74 to 250 μm. Thereafter, 1.2 parts by weight of a molding binder Kao Step S 660 (commercially available from Kao-Quaker Co., Ltd.) were added based on 100 parts by weight of the molding sand. The resulting mixture was formed into a mold (diameter: 50 mm×height: 50 mm) according to a self-hardening molding method. Subsequently, the mold was aged at room temperature for 24 hours, and thereafter the compressive strength (MPa) of the mold was determined with a compression testing machine (commercially available from Shimadzu Corporation) at 25° C. and humidity of 55%.

(3) Surface Texture of Mold

The surface of a casting after demolding from the mold was evaluated by visual observation according to the following evaluation criteria. The evaluation results were used as the evaluation results for surface texture of the mold. Specifically, if the surface of a casting is smooth, the surface texture of the mold is also smooth. A casting was produced by fusing cast iron FC-250 in a high-frequency furnace at 1400° C., and forming the molten cast iron into the shape of a rectangular parallelepiped product having dimensions of 50 mm×50 mm×400 mm.

[Evaluation Criteria]
◯: exhibiting smooth surface without any molding sand traces;
Δ: exhibiting slightly smooth surface with a few molding sand traces; and
X: exhibiting rough surface with obvious molding sand traces.

Each of the evaluation results described above is shown in Table 1. It can be seen from the results shown in Table 1 that the molding sands of Examples have excellent fluidity, as compared to the molding sands of Comparative Examples. Also, it can be seen that the casting molds obtained in Examples are excellent in strength and have smooth surface texture, as compared to those obtained in Comparative the mold shows the evaluation results of corrosion resistance and seizure resistance of the molding sand.

[Evaluation Criteria]
⊚: almost no surface property change and seizure;
◯: mild surface property change and seizure being found;
Δ: moderate surface property change and seizure being found;
X: active surface property change and seizure.

The above evaluation results are shown in Table 1 given later. It can be from the results of Table 1 that the molds obtained from the molding sands of Examples have excellent properties as compared to the molds obtained from the molding sands of Comparative Examples. Further, the molds obtained from the molding sands of Examples do not substantially undergo surface property change and seizure, so that the molds are excellent in corrosion resistance and seizure resistance. Therefore, it can be seen that the molding sand produced by a flame fusion method, wherein the molding sand contains the components MgO and $SiO_2$ in amounts falling within the scope of the present invention, which is used for producing the mold, is particularly excellent in corrosion resistance and seizure resistance.

TABLE 1

| | Molding Sand | | | | | | | Evaluation Results | | | | |
|---|---|---|---|---|---|---|---|---|---|---|---|---|
| | Method of Forming Spherical Particles | Components | Weight Ratio (to $SiO_2$) | Total Amount (% by weight) | Average Particle Size (mm) | Spherical Degree | Water Absorption (% by weight) | Fluidity of Molding Sand (sec) | Mold Strength (MPa) | Surface Texture of Mold | Corrosion Resistance and Seizure Resistance | | |
| | | | | | | | | | | | Steel | Cu | Slag |
| Comp. Ex. 1 | Sintering Method | $Al_2O_3/SiO_2$ | 3.0 | 97 | 0.26 | 0.83 | 3.5 | 11.6 | 2.6 | Δ | Δ | Δ | Δ |
| Comp. Ex. 2 | Sintering Method | $MgO/SiO_2$ | 1.59 | 97 | 0.19 | 0.79 | 2.2 | 11.7 | 2.7 | X | ◯ | ◯ | Δ |
| Comp. Ex. 3 | Flame Fusion | $SiO_2$ | — | 99 | 0.28 | 0.92 | 0.6 | 10.3 | 3.3 | Δ | Δ | X | X |
| Comp. Ex. 4 | Flame Fusion | $Al_2O_3/SiO_2$ | 2.5 | 97 | 0.26 | 0.83 | 3.5 | 11.6 | 2.6 | Δ | ◯ | Δ | Δ |
| Ex. 1 | Flame Fusion | $MgO/SiO_2$ | 1.4 | 97 | 0.26 | 0.99 | 0.3 | 9.9 | 4.6 | ◯ | ⊚ | ⊚ | ⊚ |
| Ex. 2 | Flame Fusion | $MgO/SiO_2$ | 1.4 | 97 | 0.48 | 0.98 | 0.9 | 9.0 | 4.3 | ◯ | ⊚ | ⊚ | ⊚ |
| Ex. 3 | Flame Fusion | $MgO/SiO_2$ | 1.08 | 98 | 0.21 | 0.99 | 0 | 9.1 | 4.7 | ◯ | ⊚ | ⊚ | ◯ |
| Ex. 4 | Flame Fusion | $MgO/SiO_2$ | 1.0 | 95 | 0.35 | 0.98 | 0 | 10.1 | 3.6 | ◯ | ⊚ | ⊚ | ◯ |
| Ex. 5 | Flame Fusion | $MgO/SiO_2$ | 1.45 | 95 | 0.19 | 0.99 | 0.2 | 9.6 | 3.9 | ◯ | ⊚ | ⊚ | ◯ |

Examples. The castings in the molds produced by casting with the molding sands of Examples had smooth surfaces so that loads during a subsequent polishing step satisfactorily reduced.

Test Example 2

A molten metal containing steel, copper (Cu), and slag was poured into a mold similar to that used in item (3) of Test Example 1, and a casting was demolded. Thereafter, the state of molten metal-contacted portions were observed at the cross section of the mold, and corrosion resistance and seizure resistance of the molds were evaluated according to the following evaluation criteria. Since the mold is substantially made of the molding sand itself, it can be said that the evaluation results of corrosion resistance and seizure resistance of Test Example 3

Molding sand composed of 50% by volume of the molding sand of Example 1 and 50% by volume of the molding sand of Comparative Example 2, and molding sand composed of 80% by volume of the molding sand of Example 2 and 20% by volume of the molding sand of Comparative Example 2 were obtained, and tested in accordance with Test Example 1. As a result, each of these molding sands had excellent fluidity, and each of the molds obtained from the molding sands was also excellent in strength and had smooth surface.

As illustrated in Examples described above, since the spherical molding sand of the present invention is excellent in various properties required for a molding sand, especially in corrosion resistance and seizure resistance, has a low water absorption, and is regenerated easily, so that the spherical molding sand is industrially useful.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A ceramics particle produced by a flame fusion method, wherein the ceramics particle comprises MgO and $SiO_2$ as main components, and has a $MgO/SiO_2$ weight ratio of from 1.0:1 to 1.45:1, and an average particle size of from 0.001 to 1.5 mm, and wherein the total amount of MgO and $SiO_2$ in the ceramics particle is 97% or more.

2. The ceramics particle according to claim 1, wherein the $MgO/SiO_2$ weight ratio is from 1.08:1 to 1.45:1.

3. A spherical molding sand produced by a flame fusion method, wherein the spherical molding sand comprises MgO and $SiO_2$ as main components, and has a $MgO/SiO_2$ weight ratio of from 1.0:1 to 1.45:1, and an average particle size of from 0.001 to 1.5 mm, wherein the total amount of MgO and $SiO_2$ in the spherical molding sand is 97% or more.

4. The spherical molding sand according to claim 3, wherein the spherical molding sand has an average particle size of from 0.05 to 1.5 mm.

5. The spherical molding sand according to claim 3, wherein the spherical molding sand has a water absorption of 1.5% by weight or less.

6. The spherical molding sand according to claim 4, wherein the spherical molding sand has a water absorption of 1.5% by weight or less.

7. The spherical molding sand according to claim 3, wherein the $MgO/SiO_2$ weight ratio is from 1.08:1 to 1.45:1.

8. A spherical molding sand, wherein the spherical molding sand comprises MgO and $SiO_2$ as main components, and has a $MgO/SiO_2$ weight ratio of from 1.0:1 to 1.45:1, an average particle size of from 0.001 to 1.5 mm, and a spherical degree of 0.95 or more, and wherein the total amount of MgO and $SiO_2$ in the spherical molding sand is 97% or more.

9. The spherical molding sand according to claim 8, wherein the spherical molding sand has an average particle size of from 0.05 to 1.5 mm.

10. The spherical molding sand according to claim 8, wherein the spherical molding sand has a water absorption of 1.5% by weight or less.

11. The spherical molding sand according to claim 9, wherein the spherical molding sand has a water absorption of 1.5% by weight or less.

12. The spherical molding sand according to claim 8, wherein the $MgO/SiO_2$ weight ratio is from 1.08:1 to 1.45:1.

13. A method of producing a casting comprising
preparing a spherical molding sand by a fusion flame method, wherein the spherical molding sand comprises MgO and $SiO_2$ as main components, and has a $MgO/SiO_2$ weight ratio of from 1.0:1 to 1.45:1, and an average particle size of from 0.001 to 1.5 mm,
preparing a casting mold comprising said spherical molding sand, wherein the total amount of MgO and $SiO_2$ in the spherical molding sand is 97% or more, and
demolding said casting mold to produce a casting.

14. The method according to claim 13, wherein the molding sand has an average particle size of from 0.05 to 1.5 mm.

15. The method according to claim 13, wherein the $MgO/SiO_2$ weight ratio is from 1.08:1 to 1.45:1.

16. A method of producing a casting comprising:
preparing a spherical molding sand, wherein the spherical molding sand comprises MgO and $SiO_2$ as main components, and has a $MgO/SiO_2$ weight ratio of from 1.0:1 to 1.45:1, an average particle size of from 0.001 to 1.5 mm and a spherical degree of 0.95 or more,
preparing a casting mold comprising said spherical molding sand, wherein the total amount of MgO and $SiO_2$ in the spherical molding sand is 97% or more, and
demolding said casting mold to produce a casting.

17. The method according to claim 16, wherein the molding sand has an average particle size of from 0.05 to 1.5 mm.

18. The method according to claim 16, wherein the $MgO/SiO_2$ weight ratio is from 1.08:1 to 1.45:1.

19. A process for producing a spherical molding sand, wherein the spherical molding sand comprises MgO and $SiO_2$ as main components, and has a $MgO/SiO_2$ weight ratio of from 1.0:1 to 1.45:1, and an average particle size of from 0.001 to 1.5 mm, and wherein the total amount of MgO and $SiO_2$ in the spherical molding sand is 97% or more, comprising the step of fusing in flame, powder particles comprising MgO and $SiO_2$ as main components, and having a $MgO/SiO_2$ weight ratio of from 1.0:1 to 1.45:1, and an average particle size of from 0.001 to 2 mm, wherein the total amount of MgO and $SiO_2$ in the spherical molding sand is 97% or more, to form spherical particles.

20. The process according to claim 19, wherein the powder particles have an average particle size of from 0.05 to 2 mm, to give a spherical molding sand having an average particle size of from 0.05 to 1.5 mm.

21. The process according to claim 19, wherein the $MgO/SiO_2$ weight ratio is from 1.08:1 to 1.45:1.

22. A process for producing a spherical molding sand, wherein the spherical molding sand comprises MgO and $SiO_2$ as main components, and has a $MgO/SiO_2$ weight ratio of from 1.0:1 to 1.45:1, an average particle size of from 0.001 to 1.5 mm, and a spherical degree of 0.95 or more, and wherein the total amount of MgO and $SiO_2$ in the spherical molding sand is 97% or more, comprising the step of fusing in flame, powder particles comprising MgO and $SiO_2$ as main components, and having a $MgO/SiO_2$ weight ratio of from 1.0:1 to 1.45:1, and an average particle size of from 0.001 to 2 mm, wherein the total amount of MgO and $SiO_2$ in the spherical molding sand is 97% or more, to form spherical particles.

23. The process according to claim 22, wherein the powder particles have an average particle size of from 0.05 to 2 mm, to give a spherical molding sand having an average particle size of from 0.05 to 1.5 mm.

24. The process according to claim 22, wherein the $MgO/SiO_2$ weight ratio is from 1.08:1 to 1.45:1.

25. A casting mold comprising a spherical molding sand produced by a flame fusion method, wherein the spherical molding sand comprises MgO and $SiO_2$ as main components, and has a $MgO/SiO_2$ weight ratio of from 1.0:1 to 1.45:1, and an average particle size of from 0.001 to 1.5 mm, and wherein the total amount of MgO and $SiO_2$ in the spherical molding sand is 97% or more.

26. The casting mold according to claim 25, wherein the spherical molding sand has an average particle size of from 0.05 to 1.5 mm.

27. The casting mold according to claim 25, wherein the $MgO/SiO_2$ weight ratio is from 1.08:1 to 1.45:1.

28. A casting mold comprising a spherical molding sand, wherein the spherical molding sand comprises MgO and $SiO_2$ as main components, and has a $MgO/SiO_2$ weight ratio of from 1.0:1 to 1.45:1, an average particle size of from 0.001 to 1.5 mm, and a spherical degree of 0.95 or more, and wherein the total amount of MgO and $SiO_2$ in the spherical molding sand is 97% or more.

29. The casting mold according to claim 28, wherein the spherical molding sand has an average particle size of from 0.05 to 1.5 mm.

30. The casting mold according to claim 28, wherein the $MgO/SiO_2$ weight ratio is from 1.08:1 to 1.45:1.

* * * * *